United States Patent [19]

Ishioka et al.

[11] 4,167,982
[45] Sep. 18, 1979

[54] REINFORCEMENT FRAME FOR AN OFFSET TYPE TRACTOR

[75] Inventors: Tetsuo Ishioka, Ito; Tomeaki Tama, Hashimoto; Taichi Fujihara; Yasunobu Yamaue, both of Izumi, all of Japan

[73] Assignee: Kubota, Ltd., Osaka, Japan

[21] Appl. No.: 891,491

[22] Filed: Mar. 29, 1978

[30] Foreign Application Priority Data

Nov. 10, 1977 [JP] Japan .................................. 52-135808

[51] Int. Cl.² .................... B62D 21/18; B62D 25/08
[52] U.S. Cl. ............................. 180/54 D; 280/95 R; 280/111; 280/760
[58] Field of Search ..................... 180/1 F, 55, 59, 61, 180/DIG. 2; 280/111, 112 R, 760, 785, 781, 638, 95 R

[56] References Cited

U.S. PATENT DOCUMENTS

| 2,327,850 | 8/1943 | Baker et al. | 280/111 |
| 2,375,026 | 5/1945 | Mott | 180/1 F |
| 2,593,021 | 4/1952 | Goodell | 180/1 F |

*Primary Examiner*—Joseph F. Peters, Jr.
*Assistant Examiner*—Donn McGiehan
*Attorney, Agent, or Firm*—Haseltine, Lake & Waters

[57] ABSTRACT

An offset type tractor, especially for agricultural work, comprising a structural unit including an engine and transmission casing directly connected to the engine, the unit being offset to one lateral side of the longitudinal center line of the tractor. The rear drive wheels of the tractor are mounted on the transmission casing. A reinforcement frame is securely affixed on a continuing lateral surface both of the engine and the transmission casing, on the side thereof nearer to the longitudinal center line of the tractor.

7 Claims, 4 Drawing Figures

REINFORCEMENT FRAME FOR AN OFFSET TYPE TRACTOR

BACKGROUND OF THE INVENTION

1. Field of the Invention

This invention relates to an offset type tractor, with a structural unit, comprising an engine and a transmission casing which is equipped with rear drive wheels and which casing is directly connected to the rear of the engine, said unit being offset to one lateral side of longitudinal center line of the tractor.

2. Description of the Prior Art

A tractor with an engine and a transmission casing serially connected directly to each other is known for making the entire tractor light in weight, in comparison with the tractor in which a longitudinal main frame of substantial length is provided so that the engine and the transmission casing are each mounted thereon and operatively connected with each other. By dispensing with said main frame due to the direct connection of the engine and the transmission casing there is a large reduction in weight. In such tractor serially connected engine and transmission casing are offset to one lateral side of the longitudinal center line of the tractor, and the tractor is generally referred to as being of the offset type for providing a clear, wide front view from the operator's seat, on the rear of the tractor, particularly for viewing a working implement of mid-mount type, namely an implement attached between the front and rear wheels of the tractor.

In such offset type tractor, the front wheels serve as steering wheels and it is normal to provide junction means for supporting the engine structure solely at the middle of an axle support means for the front wheels, thus substantially in the vertical longitudinal center plane of the tractor. The support junction is therefore laterally offset with respect to the engine, causing the danger of engine distortion, and since the engine weight not only produces a vertical bending moment but also a torsional moment on the connection surface between the engine and the transmission casing, there is also the danger of causing deformation and damage in said connection surface.

In order to eliminate such danger, it is necessary to provide substantially thick walls both for the engine and the transmission casing so as to obtain sufficient rigidity, and also to provide proper means for increasing the connection strength between the engine and the transmission casing; this results in increased weight and size of the drive power unit, thus reducing the desirability of the directly connected drive power unit. It should further be noted that the directly connected engine and transmission casing unit for such conventional offset type tractor can not be of identical design with that of the normal type tractor provided with such power unit extending in the longitudinal center plane, because of the particularly required modification in the former for increasing the strength to sustain the offset weight, as already mentioned above.

SUMMARY OF THE INVENTION

An object of the invention is to provide an offset type tractor in which the directly connected engine and transmission casing unit can be light in weight and compact in size, yet provide sufficient structural strength as required.

The tractor according to this invention comprises a pair of front steering wheels, a structural unit comprising an engine and a transmission casing which is equipped with a pair of rear driving wheels, said casing being directly connected to the rear of the engine, said unit being offset to one lateral side of the longitudinal center line of the tractor, said tractor including a reinforcement frame securely affixed on a continuing lateral surface both of the engine and the transmission casing, on the side nearer to the longitudinal center line of the tractor, and support means for connection with a transverse support frame of the front wheels at the front end portion of the reinforcement frame.

The provision of such reinforcement frame securely affixed on a continuing lateral surface both of the engine and the transmission casing enables the moment produced by the weight externally supported concentrically at said support means to be properly distributed therethrough to be resisted by the lateral surfaces both of the engine and the transmission casing, thus eliminating excessively concentrated stresses in any connecting portion, namely between the reinforcement frame and the engine, between the reinforcement frame and the transmission casing, or between the engine and the transmission casing.

Therefore, it is no longer required to provide substantially thick walls for the engine and the transmission casing or to provide means for increasing the connection strength between the engine and the transmission casing. Thus it is possible to make the engine and the transmission casing comparatively light in weight and compact in size, while providing sufficient structural strength when mounted on and incorporated in the tractor.

The provision of the reinforcement frame also makes it possible to use the directly connected engine and transmission casing unit both in tractors of offset type and normal center-aligned type. This is advantageous in reducing the number of the models to be manufactured and reduced costs due to mass production.

The essential object of this invention is thus to guarantee sufficient structural strength of the directly connected drive power unit in tractors of the type mentioned above, without substantially increasing the weight and size, by effectively resisting the moment caused by the offset weight externally supported concentrically at the support means on the wheel axle system by the engine and transmission casing surfaces.

Another object of this invention is to make it possible to use the directly connected engine and transmission casing unit both for the offset type and normal center-aligned type tractors, thus to reduce the costs of manufacture by enabling mass production of such common units.

Still further objects and advantages of this invention will become clear from the following detailed description given in conjunction with the attached drawings.

BRIEF DESCRIPTION OF THE DRAWINGS

The drawings show, by way of example, an embodiment of the offset type tractor according to this invention, in which.

DESCRIPTION OF THE PREFERRED EMBODIMENT

Figure 1:
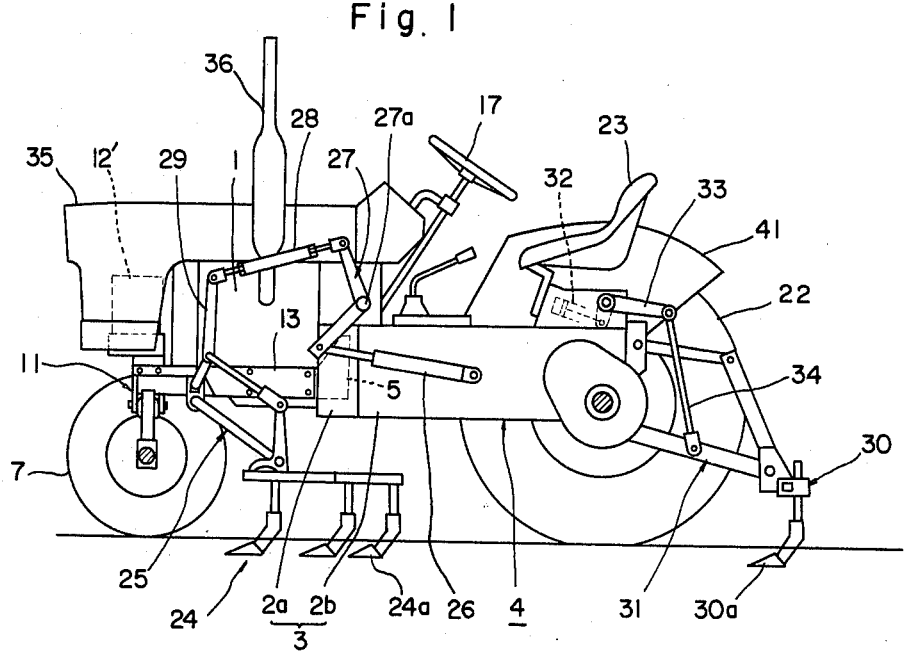
FIG. 1 is an overall side elevation view of the tractor with cultivation implements attached thereto.

Referring to the drawings, a drive power unit generally designated at 4 includes an engine 1, and a transmission casing 3 which is directly connected to the rear of the engine 1 and which comprises main clutch case portion 2a and transmission gearing case portion 2b. On a lateral side surface of the unit 4, extending over the region from the engine 1 to the main clutch case portion 2a of the transmission casing 3, there is securely affixed a reinforcement frame 5 by means of bolts 6 inserted through holes 5a and 5b provided for this purpose in the frame 5. The power unit 4 is offset to one lateral side of the longitudinal center line of the tractor, so that the reinforcement frame 5 extends in the vertical longitudinal center plane of the tractor. At the front end portion of the reinforcement frame 5 there is a support means 11 for connection with a transverse support frame 8 having opposite ends for free rotational support of front steerable wheels. The support means 11 includes a pair of front and rear brackets 10 fixed to the front end portion of the reinforcement frame 5, and a center pin 9 between the front and rear brackets 10. The pin 9 extends through the support frame 8 at the middle thereof for pivotally interconnecting the reinforcement frame 5 and the support frame 8 for free relative rocking movement with respect to each other around pin 9.

The reinforcement frame 5 has a lateral extension at the front end portion thereof, to which there is affixed a platform 12 for support of electrical storage batteries 12′, forwardly of the engine 1.

A retainer tube 14 for the attachment of one or more working implements is affixed to the reinforcement frame 5 to extend transversely therefrom at an intermediate longitudinal position thereof, and there are further affixed, to the reinforcement frame 5, also at an intemediate longitudinal position thereof, a transverse support plate 15 securely afffixed to the front face of the engine 1, and a holder plate 16 for securing a gearing box 18 of the steering system of the tractor thereon.

In the illustrated embodiment there is still further provided an auxiliary reinforcement frame 13 bolted to the common lateral surface, on the side opposite to said main reinforcement frame 5, of the engine 1 and the platform 12.

Figure 4:
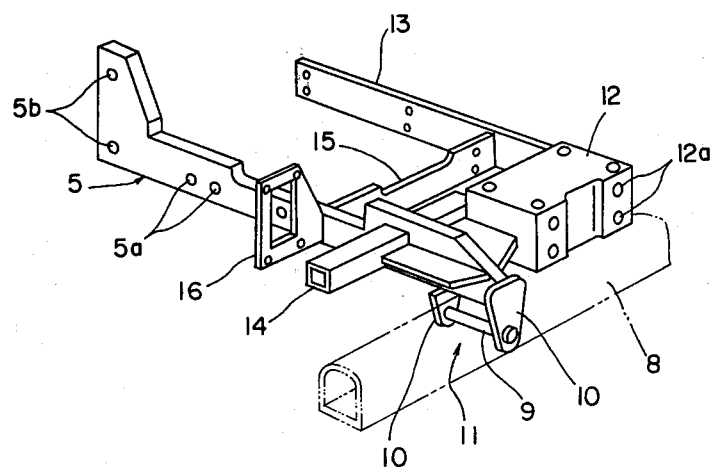
FIG. 4 is a perspective view of the support structure of FIG. 3.

Designated at 12a in FIG. 4 are holes for attaching accessory devices (not illustrated), such as, for instance, a bumper or balance weight.

As is conventional and well known, the front wheels 7 are mounted on either end of the support frame 8 for free steering by pivotal rocking around respective kingpins 20 as actuated via knuckle arms 21 each pin-connected to respective tie-rods 19 which in turn are operatively connected to steering wheel 17 via a link mechanism including a gearing encased in the gearing box 18.

A pair of rear drive wheels 22 are mounted on the transmission gearing case portion 2b of the transmission casing 3. An operator's seat 23 is mounted between the two rear wheels 22, somewhat offset from the longitudinal center line on the side opposite to the power unit 4.

In the illustrated embodiment, a cultivator 24 with three tiller tines 24a is attached to each lateral side of the retainer tube 14 via link mechanism 25. The pair of link mechanisms 25 are operatively connected to a working piston of a hydraulic cylinder 26 provided on the outer lateral surface of the power unit 4 via respective L-shaped lift arms 27, connecting rods 28 and connecting arms 29, for raising and lowering the tiller tines. The pair of lift arms 27 are interconnected by a common transverse pivot 27a rotatably extending through the power unit 4, to provide a rigid assembly free to pivotally rock around the pivot 27a.

Furthermore, a cultivator 30 with two tiller tines 30a is attached to the rear of the power unit 4 by means of a conventional three-point link mechanism 31, and is suspended by lift arms 33, via respective connecting rods 34. A hydraulic cylinder 32 accommodated in the transmission gearing case portion 2b of the transmission casing 3 is connected to arms 33 to raise and lower the mechanism 31.

Figure 2:
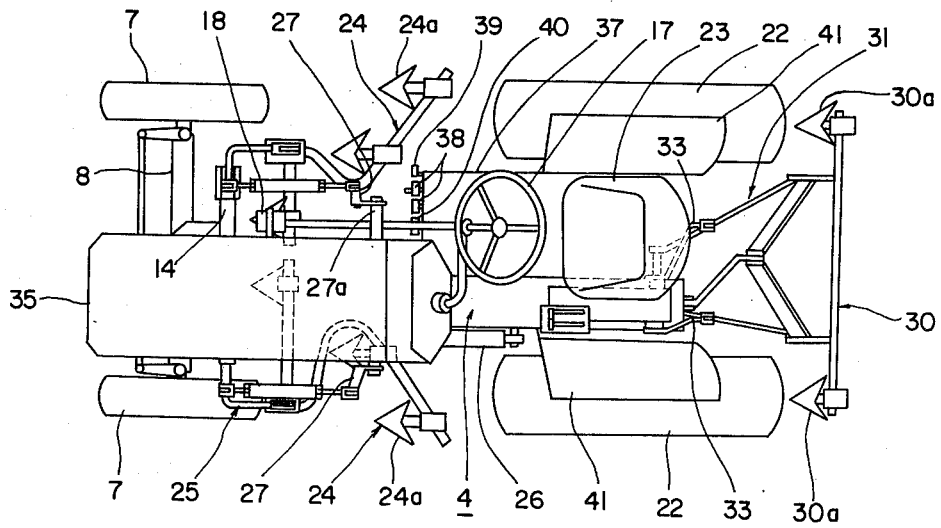
FIG. 2 is an overall plan view thereof.
Figure 3:
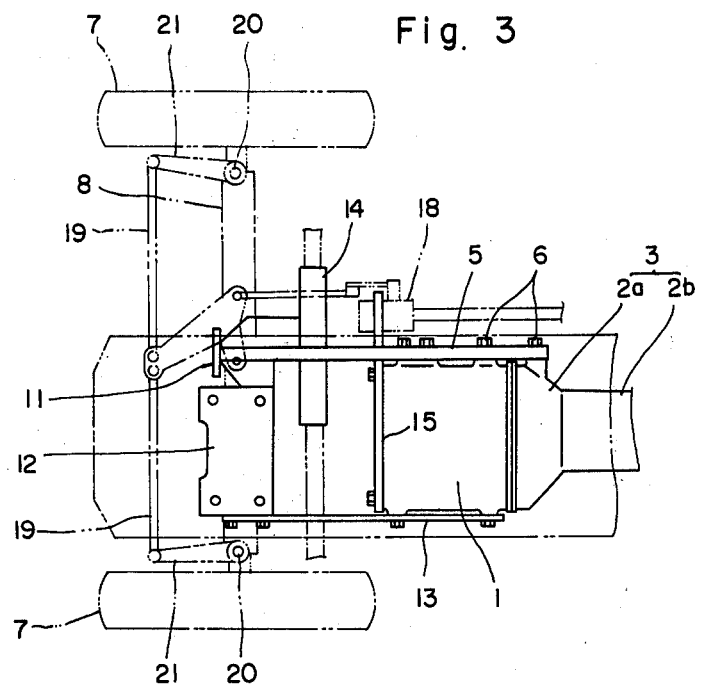
FIG. 3 is a plan view showing the structural assembly supported by front wheels of the tractor.

FIGS. 1 and 2 also show a hood 35, a muffler 36, a stepping plate 37, brake pedals 38 each for applying braking force to the respective driving wheels 22 independently of each other but with the possibility of providing proper bridging means for connecting the two pedals 38 to provide common braking effort simultaneously on both of the driving wheels 22 during travel on normal roads, accelerator pedal 39, main clutch pedal 40, and fenders 41 for the driving wheels 22.

As is now clear, the moment produced by the offset weight externally supported concentrically at support means 11 on the wheel axle system is effectively distributed, through the reinforcement frame 5 extending in the vertical longitudinal center plane of the tractor, to be resisted by the lateral surfaces both of the engine 1 and the front portion of the transmission casing 3, thus eliminating excessively concentrated stresses in any connecting portion, namely between the reinforcement frame 5 and the engine 1, between the reinforcement frame 5 and the transmission casing 3, or between the engine 1 and the transmission casing 3.

Since the transverse support plate 15 affixed to the front face of the engine 1 is secured to the reinforcement frame 5, the moment is also partly resisted by the front face of the engine as well, and distortion of the engine 1 is thus further effectively reduced, particularly with respect to torsional deformation.

The illustrated and described embodiment with the retainer tube 14 for attaching the working implements, the holder plate 16 for securing the gearing box 18 of steering system thereon, and the platform 12 for the electric batteries 12′, all integrally secured to the reinforcement frame 5, is also advantageous in that the structure shown in FIG. 4 may be assembled in a separate assembly process to make up the integral entity which may later be mounted on the power unit 4, thus to realize high production efficiency best suited for mass production system, and far better than in the case where the constituent members 14, 16 and 12 are affixed to the power unit 4 individually and separately.

We claim:

1. An offset type tractor having a longitudinal center line and comprising a pair of steerable front wheels (7), a transverse support frame (8) for the front wheels (7), a structural unit (4) comprising an engine (1) and a transmission casing (3), a pair of rear drive wheels (22) mounted on said casing, said casing being directly connected to the rear of the engine (1) to form a unit, said engine and casing unit being offset to one lateral side of the longitudinal center line of the tractor, a reinforcement frame (5) secured to a lateral surface of said unit on the side thereof nearer to the longitudinal center line of the tractor, and support means (11) on a front end portion of the reinforcement frame (5) for connection with the transverse support frame (8) for the front wheels (7).

2. The tractor of claim 1, comprising a transverse support plate (15) attachable to the front face of the engine (1) secured to the reinforcement frame (5).

3. The tractor of claim 2 comprising a retainer tube for attachment of at least one working implement secured to said reinforcement frame.

4. The tractor of claim 2 comprising a holder plate means for a gearing box of a steering means for the front wheel secured to said reinforcement frame.

5. The tractor of claim 2 comprising a platform for support of at least one electrical storage battery secured to said reinforcement frame.

6. The tractor of claim 1 wherein said reinforcement frame is disposed on said longitudinal center line of the tractor.

7. The tractor of claim 1 wherein said lateral surface of said unit is a surface extending along both said engine and said transmission casing.

* * * * *